US010512922B2

(12) United States Patent
Cvetezar et al.

(10) Patent No.: US 10,512,922 B2
(45) Date of Patent: Dec. 24, 2019

(54) SPRAY GUN

(71) Applicants: Brian Cvetezar, Manitowoc, WI (US);
Ernie Cvetezar, Manitowoc, WI (US);
Jeff Cvetezar, Manitowoc, WI (US)

(72) Inventors: Brian Cvetezar, Manitowoc, WI (US);
Ernie Cvetezar, Manitowoc, WI (US);
Jeff Cvetezar, Manitowoc, WI (US)

( * ) Notice: Subject to any disclaimer, the term of this patent is extended or adjusted under 35 U.S.C. 154(b) by 336 days.

(21) Appl. No.: 15/229,000

(22) Filed: Aug. 4, 2016

(65) Prior Publication Data
US 2018/0036751 A1 Feb. 8, 2018

(51) Int. Cl.
| B05B 7/00 | (2006.01) |
| B05B 7/02 | (2006.01) |
| E04G 23/02 | (2006.01) |
| F16L 15/00 | (2006.01) |
| F16L 27/08 | (2006.01) |
| F16L 37/084 | (2006.01) |
| E02D 35/00 | (2006.01) |
| E04B 5/16 | (2006.01) |
| B05B 12/00 | (2018.01) |
| B05B 12/14 | (2006.01) |
| E01C 23/10 | (2006.01) |

(52) U.S. Cl.
CPC .............. *B05B 7/0018* (2013.01); *B05B 7/02* (2013.01); *E02D 35/005* (2013.01); *E04G 23/0288* (2013.01); *F16L 15/006* (2013.01); *F16L 27/0808* (2013.01); *F16L 37/0841* (2013.01); *B05B 7/0025* (2013.01); *B05B 12/006* (2013.01); *B05B 12/1409* (2013.01); *E01C 23/10* (2013.01); *E04B 5/16* (2013.01); *E04B 2103/02* (2013.01)

(58) Field of Classification Search
CPC ....... B05B 7/0018; B05B 7/02; B05B 7/0025; B05B 12/006; B05B 12/1409; F16L 27/0808; F16L 15/006; F16L 37/0841; F16L 15/00; F16L 15/02; E04G 23/0288; E04G 2103/02; E04G 5/16; E02D 35/005; E01C 23/10
USPC ............ 285/32, 272, 272.1, 294.4, 355, 390
See application file for complete search history.

(56) References Cited

U.S. PATENT DOCUMENTS

| 167,675 A | * | 9/1875 | Koehler | .............. | F16L 37/0841 |
| | | | | | 285/317 |
| 1,103,212 A | * | 7/1914 | Kraemer | ............. | F16L 37/0841 |
| | | | | | 285/317 |
| 1,372,297 A | | 3/1921 | Kennedy | | |
| 1,930,833 A | | 10/1933 | Barrett | | |

(Continued)

OTHER PUBLICATIONS

United States Patent Office Action for U.S. Appl. No. 15/228,979 dated Jan. 25, 2018 (10 pages).

(Continued)

*Primary Examiner* — Darren W Gorman
*Assistant Examiner* — Steven M Cernoch
(74) *Attorney, Agent, or Firm* — Michael Best & Friedrich LLP

(57) ABSTRACT

An injection port for a spray gun includes a first end and a second end disposed opposite the first end along a longitudinal axis. The injection port also includes an interior passage extending between the first end and the second end along the longitudinal axis, and a plurality of blind bores disposed at the first end, each blind bore extending perpendicular to the longitudinal axis.

13 Claims, 16 Drawing Sheets

(56) References Cited

U.S. PATENT DOCUMENTS

| | | | |
|---|---|---|---|
| 2,032,789 A | 3/1936 | Bramsen | |
| 2,262,585 A | 11/1941 | Irmischer | |
| 2,762,636 A | 9/1956 | Bergman | |
| 2,848,254 A | 8/1958 | Millar | |
| 3,437,273 A * | 4/1969 | Hagfors | B05B 7/1209 239/414 |
| 3,746,048 A | 7/1973 | Harper | |
| 3,790,030 A | 2/1974 | Ives | |
| 3,837,575 A | 9/1974 | Lehnert | |
| 4,079,969 A | 3/1978 | Wilson et al. | |
| 4,169,545 A | 10/1979 | Decker | |
| 4,186,946 A | 2/1980 | Snow | |
| 4,260,184 A | 4/1981 | Greenawalt | |
| 4,501,322 A * | 2/1985 | Martin | E21B 37/02 15/104.2 |
| 4,564,225 A * | 1/1986 | Taylor | F16L 15/006 285/333 |
| 4,907,828 A * | 3/1990 | Chang | E21B 47/011 285/184 |
| 4,913,317 A | 4/1990 | Wernicke | |
| 4,955,544 A | 9/1990 | Kopp | |
| 5,143,347 A | 9/1992 | Lee | |
| 5,241,980 A | 9/1993 | Corte | |
| 5,246,143 A | 9/1993 | Cherfane | |
| 5,257,486 A | 11/1993 | Holmwall | |
| 5,339,991 A | 8/1994 | Snyder | |
| 5,533,549 A | 7/1996 | Sherman | |
| 5,538,189 A | 7/1996 | Rogers | |
| 5,924,599 A | 7/1999 | Brown | |
| 5,950,875 A | 9/1999 | Lee et al. | |
| 6,447,028 B1 | 9/2002 | LaMarca | |
| 6,460,617 B1 * | 10/2002 | Allen | E21B 33/1204 15/104.2 |
| 6,460,898 B1 | 10/2002 | Chieh | |
| 6,824,170 B2 | 11/2004 | Lee | |
| 6,860,514 B2 | 3/2005 | Wentworth | |
| 7,140,797 B2 * | 11/2006 | Hunter | B05C 17/00553 401/188 R |
| 7,267,288 B2 * | 9/2007 | Wheeler, Jr. | B29C 44/06 222/566 |
| 7,267,374 B2 * | 9/2007 | Nielson | F16L 27/0808 285/353 |
| 7,270,348 B2 * | 9/2007 | Parrott | F16L 27/0808 285/275 |
| 7,694,893 B2 | 4/2010 | Zittel et al. | |
| 7,703,814 B2 | 4/2010 | Wei | |
| 9,192,950 B2 * | 11/2015 | Carleton | B05B 7/0081 |
| 2003/0150872 A1 | 8/2003 | Huber et al. | |
| 2003/0156893 A1 | 8/2003 | Takagi | |
| 2005/0184514 A1 | 8/2005 | Pettesch | |
| 2008/0016950 A1 | 1/2008 | Kubala | |
| 2008/0135579 A1 | 6/2008 | Bertram et al. | |
| 2008/0257979 A1 | 10/2008 | Crawford | |
| 2010/0069517 A1 | 3/2010 | Swab et al. | |
| 2010/0270400 A1 | 10/2010 | Evar et al. | |
| 2012/0305272 A1 * | 12/2012 | Grandpierre | A62C 5/002 169/14 |
| 2015/0323109 A1 | 11/2015 | Dupal | |
| 2017/0074051 A1 * | 3/2017 | Atkins | E21B 17/042 |

OTHER PUBLICATIONS

First Office Action from the Mexican Intellectual Property Office for Application No. MX/a/2013/005117 dated Feb. 8, 2016 (8 pages).
Second Office Action from the Mexican Intellectual Property Office for Application No. MX/a/2013/005117 dated Sep. 30, 2016 (6 pages).
HMI, "Quick Start Guide Standard Maintenance Troubleshooting," operating manual (was first made public in Apr. 2012) pp. 1-27, www.mudpumps.com.
Elite ONE, "Introducing the HMI EliteONE," website , published on Jun. 15, 2016, https://www.youtube.com/watch?v=RYnUywAoW6Q.
Office Action from the US Patent and Trademark Office for U.S. Appl. No. 13/801,390 dated Aug. 2, 2016 (13 pages).
International Search Report and Written Opinion for Application No. PCT/US2017/045323 dated Oct. 6, 2017 (16 pages).

* cited by examiner

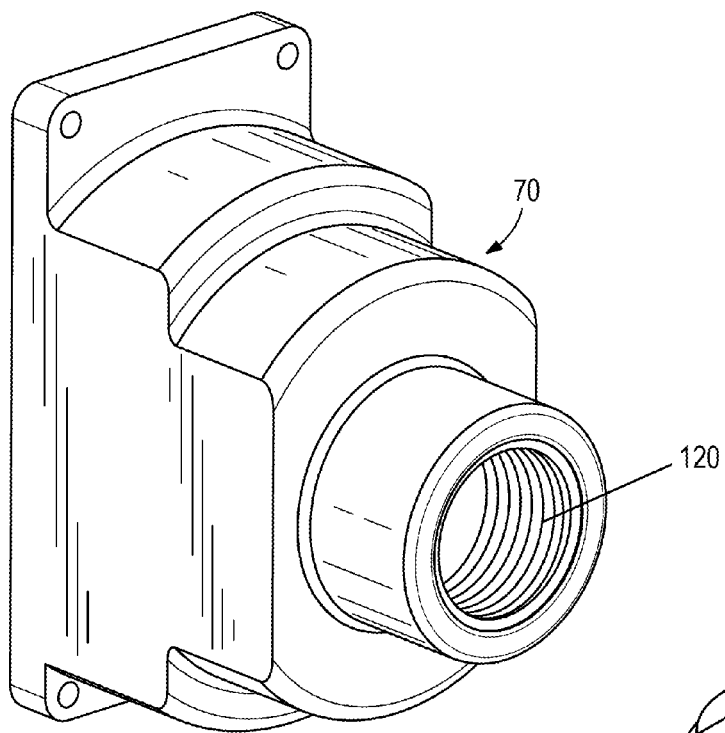
FIG. 5
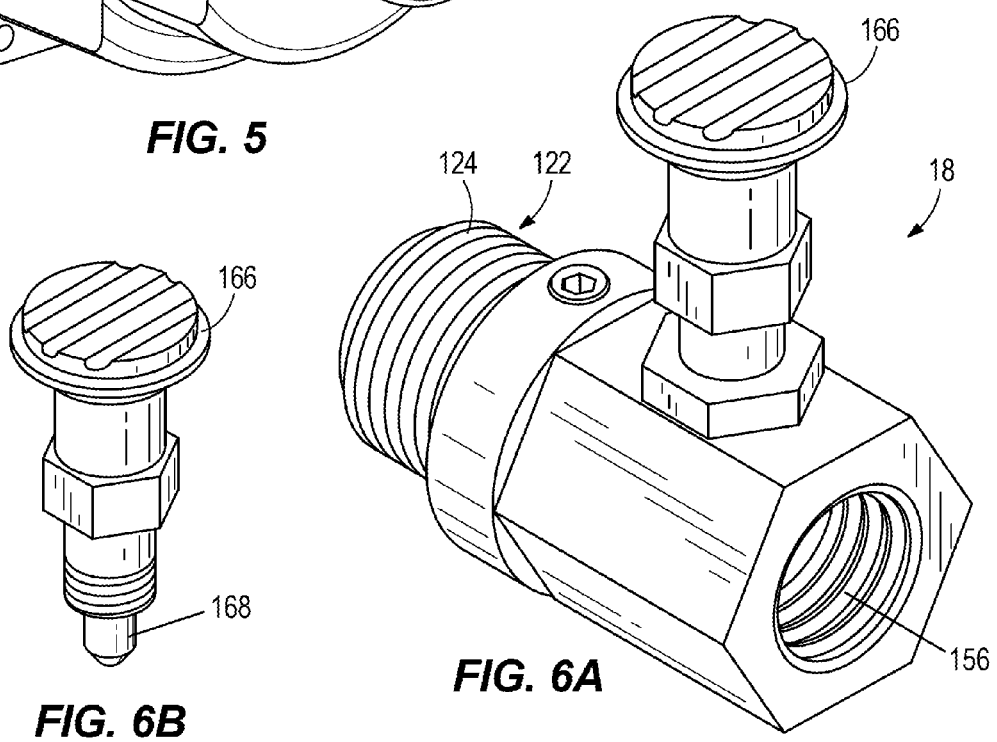
FIG. 6B
FIG. 6A

SPRAY GUN

BACKGROUND

Spray guns are used to inject polyurethane foam underneath concrete for the purpose of raising the concrete and filling voids in the concrete. Spray guns typically receive a liquid isocyanate, also referred to as an "A" component, and a liquid blend of polyols, also referred to as a "B" component. These two components are mixed in a mix chamber of the spray gun to form the polyurethane foam. The polyurethane foam is then purged with pressurized air from a fluid housing of the spray gun. However, current spray guns are often bulky, require excessive numbers of components, and are difficult to assemble and disassemble. Thus, there is a need for a more versatile spray gun that will reduce downtime, increase productivity, and lower repair costs.

SUMMARY

In accordance with one embodiment, a fluid housing for a spray gun includes a main body with a first inlet for connection to a source of pressurized air, a second inlet for connection to a source of a first polyurethane foam component, and a third inlet for connection to a source of a second polyurethane foam component, the main body further including a valve block having a center gear, a first valve gear coupled to and driven by the center gear, a second valve gear coupled to and driven by the center gear, and a third valve gear coupled to and driven by the center gear In accordance with another embodiment, a fluid housing for a spray gun includes a main body with a first inlet for connection to a source of pressurized air, a second inlet for connection to a source of a first polyurethane foam component, and a third inlet for connection to a source of a second polyurethane foam component. The fluid housing also includes a mix block coupled to the main body, wherein the mix block includes a set of internal threads. The fluid housing also includes a lever coupled to the main body, wherein the lever is adjustable to an OFF position where no air or polyurethane components are permitted to move through the main body, an AIR position where only air is permitted to move through the main body, and a FOAM position where only the first and second polyurethane foam components are permitted to move through the main body In accordance with another embodiment, a swivel connector for a spray gun includes a first portion, the first portion including a first interior passage that extends entirely through the first portion along a longitudinal axis and a second a second interior passage that extends along a first axis perpendicular to the longitudinal axis. The swivel connector also includes a second portion coupled to the first portion, the second portion including a third interior passage that extends entirely through the second portion along the longitudinal axis, and a fourth interior passage that extends along a second axis perpendicular to the longitudinal axis. The swivel connector also includes a connector pin coupled to both the first portion and the second portion, wherein the connector pin includes a fifth interior passage that extends along the longitudinal axis.

In accordance with another embodiment, a swivel connector for a spray gun includes a first portion and a second portion coupled to the first portion, the second portion including a first interior passage that extends along a longitudinal axis and a second interior passage that extends along an axis perpendicular to the longitudinal axis, wherein the first interior passage defines an interior space. The swivel connector also includes a spring-biased locking member coupled to the second portion, wherein a portion of the spring-biased locking member extends into the second interior passage and is biased perpendicular to the longitudinal axis and radially-inwardly toward to first interior passage.

In accordance with another embodiment, an injection port for a spray gun includes a first end and a second end disposed opposite the first end along a longitudinal axis. The injection port also includes an interior passage extending between the first end and the second end along the longitudinal axis, and a plurality of blind bores disposed at the first end, each blind bore extending perpendicular to the longitudinal axis.

In accordance with another embodiment, an injection port for a spray gun includes a first end and a second end disposed opposite the first end along a longitudinal axis. The injection port also includes an interior passage extending between the first end and the second end along the longitudinal axis, and a set of external threads disposed adjacent the first end, wherein the external threads include a plurality of different starting points.

In accordance with another embodiment, a spray gun includes a fluid housing having a main body with a first inlet for connection to a source of pressurized air, a second inlet for connection to a source of a first polyurethane foam component, and a third inlet for connection to a source of a second polyurethane foam component. The fluid housing also includes a mix block coupled to the main body, wherein the mix block includes a set of internal threads. The fluid housing also includes a lever coupled to the main body, wherein the lever is adjustable to an OFF position where no air or polyurethane components are permitted to move through the main body, an AIR position where only air is permitted to move through the main body, and a FOAM position where only the first and second polyurethane foam components are permitted to move through the main body. The spray gun also includes a swivel connector releasably coupled to the fluid housing. The swivel connector includes a first portion and a second portion coupled to the first portion. The second portion includes a first interior passage that extends along a longitudinal axis and a second interior passage that extends along an axis perpendicular to the longitudinal axis, wherein the first interior passage defines an interior space. The swivel connector also includes a spring-biased locking member coupled to the second portion, wherein a portion of the spring-biased locking member extends into the second interior passage and is biased perpendicular to the longitudinal axis and radially-inwardly toward to first interior passage. The spray gun also includes an injection port releasably coupled to the swivel connector, the injection port having a first end and a second end disposed opposite the first end along a longitudinal axis. An interior passage extends between the first end and the second end along the longitudinal axis. The injection port also includes a plurality of blind bores disposed at the first end, wherein each blind bore extends perpendicular to the longitudinal axis.

Other aspects of the invention will become apparent by consideration of the detailed description and accompanying drawings.

BRIEF DESCRIPTION OF THE DRAWINGS

FIG. 5 is a schematic, perspective view of the fluid housing.

FIGS. 6A and 6B are perspective views of a swivel connector of the spray gun.

It should be understood that the invention is not limited in its application to the details of construction and the arrangements of the components set forth in the following description or illustrated in the above-described drawings. The invention is capable of other embodiments and of being practiced or being carried out in various ways. Also, it is to be understood that the phraseology and terminology used herein is for the purpose of description and should not be regarded as limiting.

DETAILED DESCRIPTION

A "polyurethane foam" as used herein refers to polymers that contain the molecular structure of urethane —(—NH—CO—O—)—, urea —(—NH—CO—NH—)—, or both. Such polymers are typically obtained by reacting polyisocyanates, also referred to as the "A" component, with isocyanate-reactive compounds such as polyols, also referred to as the "B" component, often using foaming agents. As used herein, the terms "top," "bottom," "front," "rear," "side," "upwardly," "downwardly," and other directional terms are not intended to require any particular orientation, but are instead used for purposes of description only.

Figure 1:
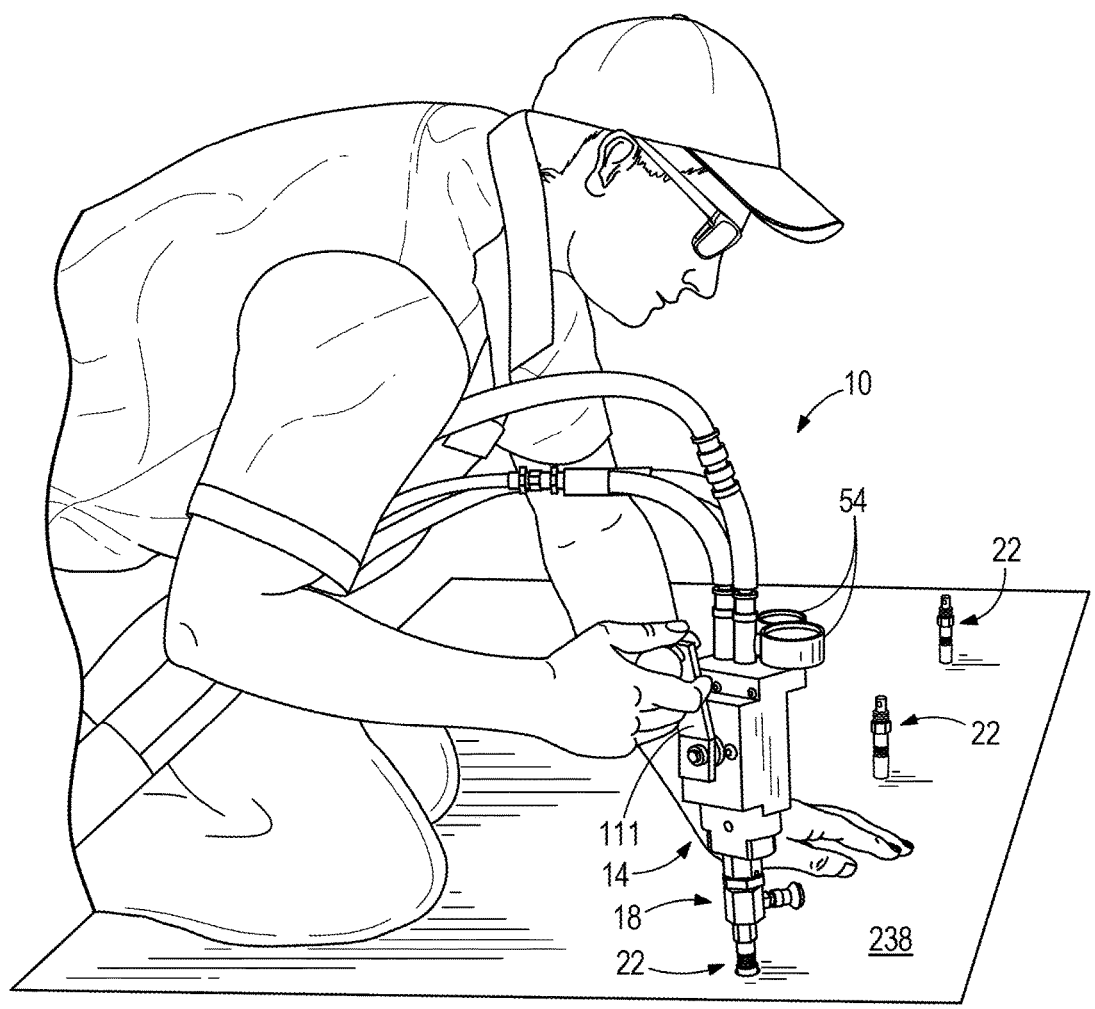
FIG. 1 is a perspective view of an operator using a spray gun in accordance with one embodiment.
Figure 14:
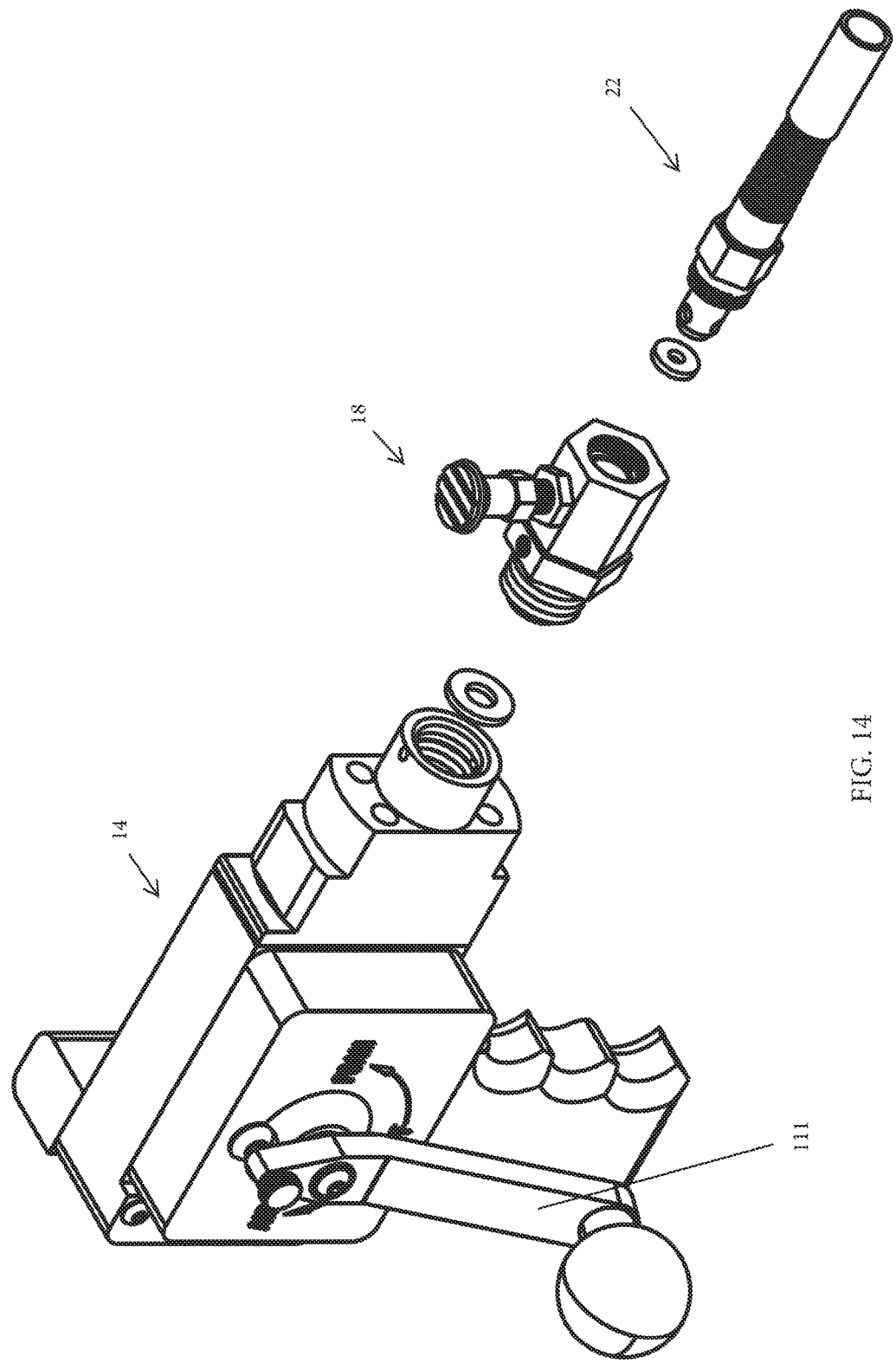
FIG. 14 is a perspective exploded view of the spray gun.

FIGS. 1 and 14 are perspective views of a spray gun 10 that receives both "A" and "B" components and mixes the two components, thereby forming a polyurethane foam. The spray gun 10 sprays the polyurethane foam with the use of pressurized air. The spray gun 10 includes a fluid housing 14, a swivel connector 18 releasably coupled to the fluid housing 14, and an injection port 22 releasably coupled to the swivel connector 18.

Figure 2:
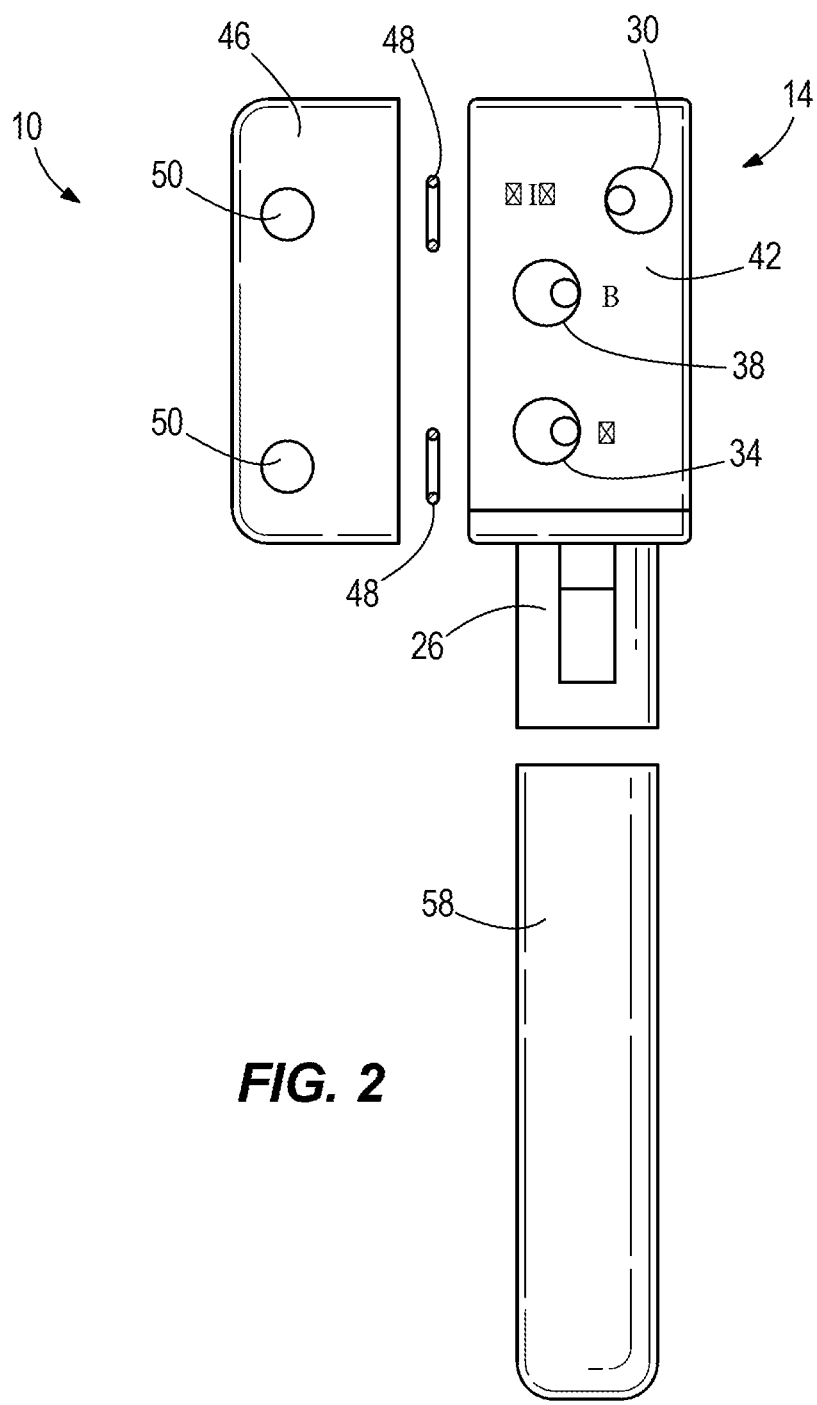
FIG. 2 is a schematic, exploded rear view of a fluid housing of the spray gun.

With reference to FIG. 2, the fluid housing 14 includes a main body 26. The main body 26 includes a first inlet 30 for connection to a source of pressurized air, a second inlet 34 for connection to a source of the "A" component, and a third inlet 38 for connection to a source of the "B" component. In the illustrated embodiment, each of the first inlet 30, the second inlet 34, and the third inlet 38 are disposed along a rear wall 42 of the main body 26. In other embodiments one or more of the first inlet 30, the second inlet 34, and the third inlet 38 are disposed at other locations along the main body 26.

With continued reference to FIG. 2, the fluid housing 14 further includes a gage mounting block 46. The gage mounting block 46 is coupled to the main body 26 (e.g., with one or more fasteners, not shown), and is sealed to the main body 26 with one or more sealing members 48 (e.g., O-rings). The gage mounting block 46 includes one or more mounting members 50 (e.g., threaded apertures, threaded posts, etc.) to mount one or more gages 54 (FIG. 1). In the illustrated embodiment, the gages 54 indicate an air pressure at the first inlet 30, a pressure of the "A" component at the second inlet 34, and/or a pressure of the component "B" at the third inlet 38, although other numbers and types of gages may also be used.

With continued reference to FIG. 2, the fluid housing 14 further includes a handle 58. The handle 58 is coupled to the main body 26 (e.g., integrally formed with the main body 26, or coupled to the main body 26 with one or more fasteners).

Figure 3:
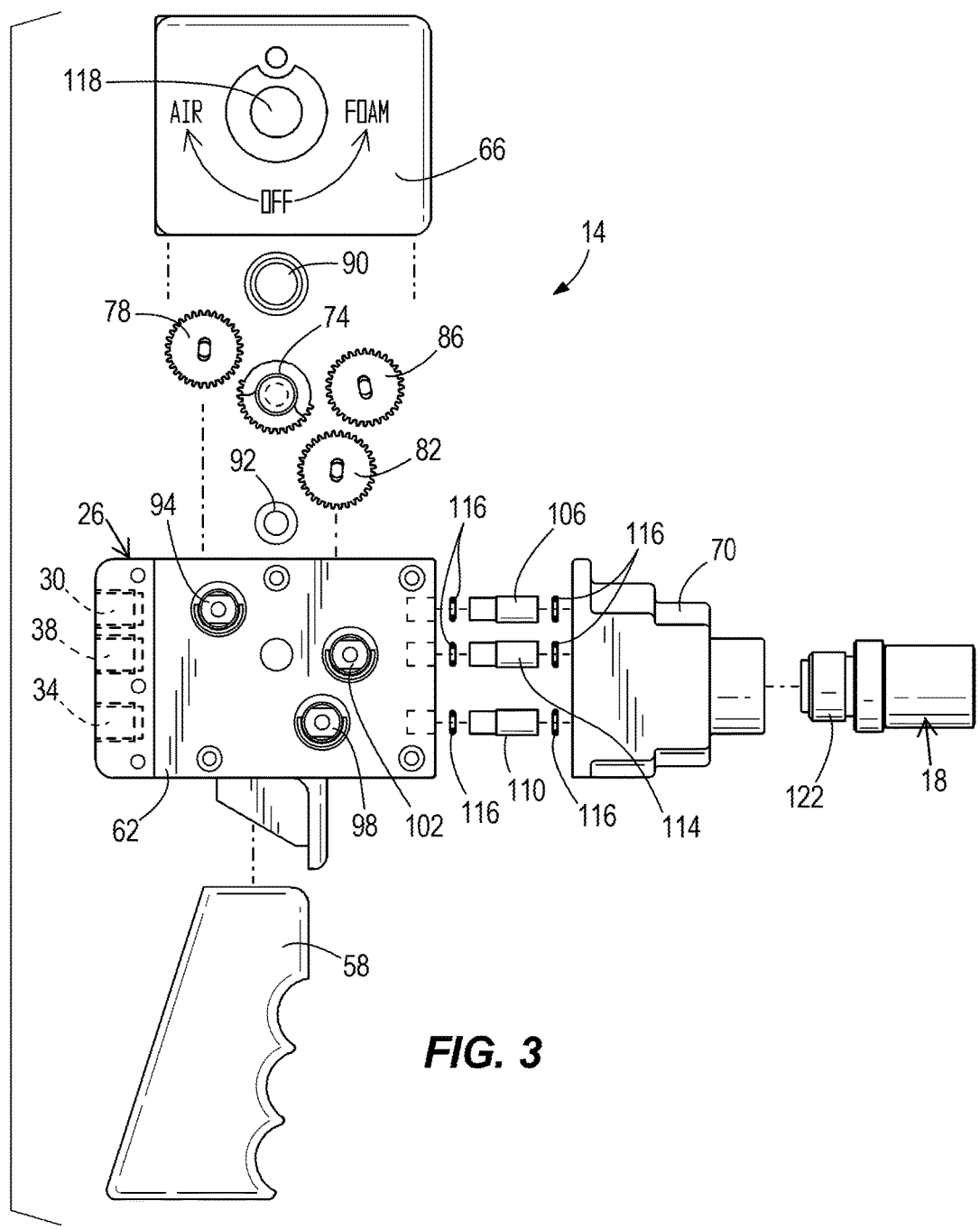
FIG. 3 is a schematic, exploded side view of the fluid housing.
Figure 4:
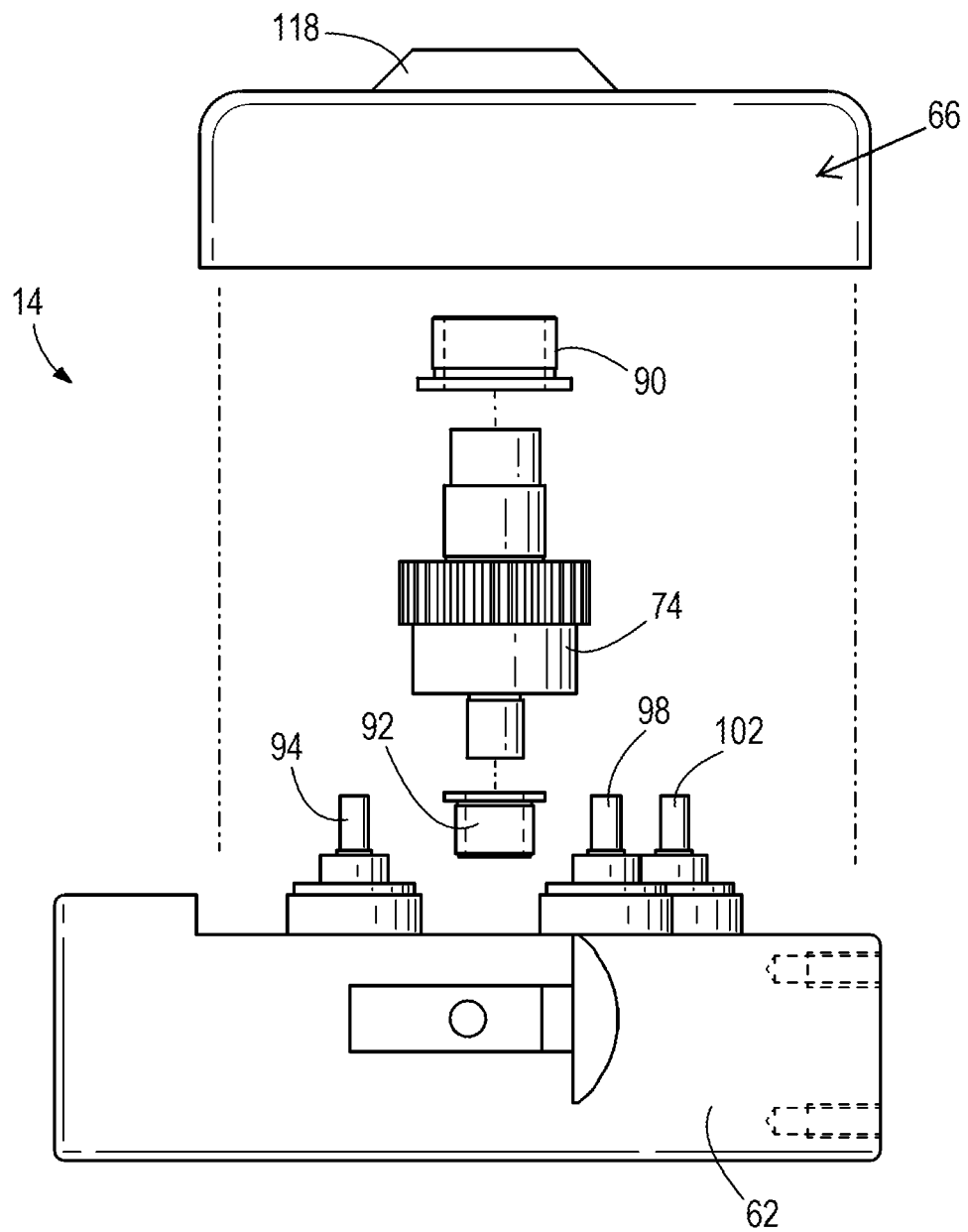
FIG. 4 is a schematic, exploded bottom view of the fluid housing.
Figure 4A:
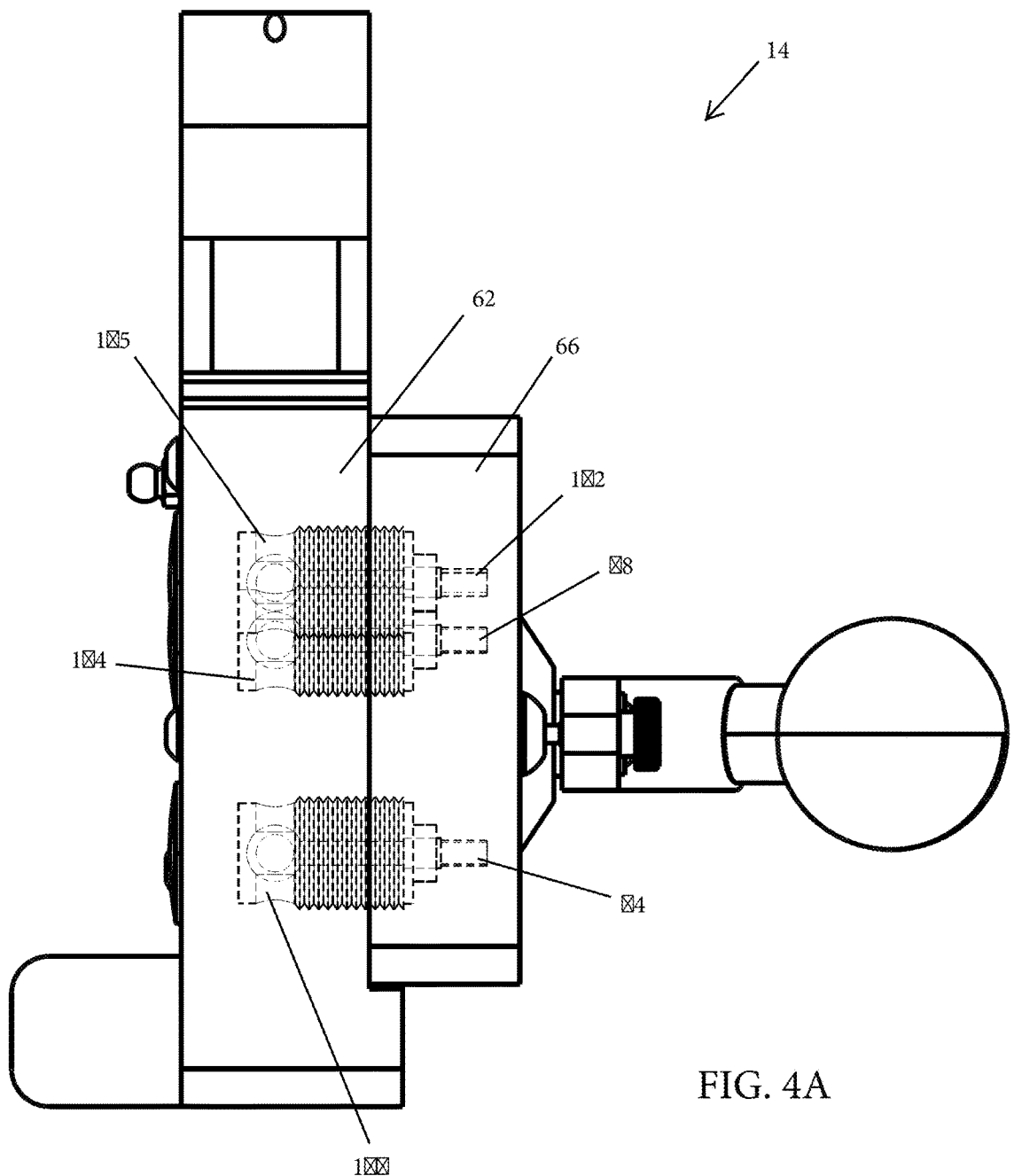
FIG. 4A is a schematic view of the fluid housing, illustrating three ball valves.

With reference to FIGS. 3, 4 and 4A, the main body 26 includes a valve block 62, a valve block cover 66 coupled to the valve block 62, and a mix block 70 coupled to the valve block 62. The valve block 62 includes a center gear 74, a first valve gear 78 coupled to (e.g., directly coupled to) and driven by the center gear 74, a second valve gear 82 coupled to (e.g., indirectly coupled to) and driven by the center gear 74, and a third valve gear 86 coupled to (e.g., directly coupled to) and driven by the center gear 74. As illustrated in FIGS. 3 and 4, sealing members 90 and 92 are coupled over and underneath the center gear 74, respectively. Additionally, the first valve gear 78 fits over a first valve gear post 94, the second valve gear 82 fits over a second valve gear post 98, and the third valve gear 86 fits over a third valve gear post 102.

The valve block cover 66 fits over each of the center gear 74, the first valve gear 78, the second valve gear 82, the third valve gear 86, the sealing members 90 and 92, the first valve gear post 94, the second valve gear post 98, and the third valve gear post 102. In some embodiment the valve block cover 66 is removably coupled to the valve block 62, so that the valve block cover 66 may be removed for maintenance and repair of one or more of the center gear 74, the first valve gear 78, the second valve gear 82, the third valve gear 86, the sealing members 90 and 92, the first valve gear post 94, the second valve gear post 98, and the third valve gear post 102.

With reference to FIG. 4A, the first valve gear post 94 is coupled to a first ball valve 103 (shown in a closed position), the second valve gear post 98 is coupled to a second ball valve 104 (shown in a closed position), and the third valve gear post 102 is coupled to a third ball valve 105 (shown in a closed position).

With continued reference to FIGS. 3 and 4, the valve block 62 further includes a first check valve 106, a second check valve 110, and a third check valve 114. As illustrated in FIG. 3, the first check valve 106 is aligned with the first valve gear 78 and with the first inlet 30 (for air), the second check valve 110 is aligned with the second valve gear 82 and with the second inlet 34 (for the "A" component), and the third check valve 114 is aligned with the third valve gear 86 and with the third inlet 38 (for the "B" component). Sealing members 116 (e.g., O-rings) are provided for each of the check valves 106, 110, 114 to seal the check valves 106, 110, 114 within the fluid housing 14.

With continued reference to FIGS. 3 and 4, the valve block cover 66 includes a knob 118 that is coupled to the center gear 74, such that rotation of the knob 118 rotates the center gear 74, and thus at least one of the first valve gear 78, the second valve gear 82, the third valve gear 86. As illustrated in FIG. 3, in some embodiments the valve block cover 66 includes markings that indicate each of an "AIR" position, an "OFF" position, and a "FOAM" position of the knob 118. As illustrated in FIGS. 1 and 14, in some embodiments the knob 118 is additionally coupled to a lever 111, so that an operator may easily adjust a rotational position of the knob 118 by turning the lever 111. In some embodiments the lever 111 includes a locking pin or other structure that prevents the lever 111 from accidentally moving from the "OFF" position to one of the "AIR" or "FOAM" positions.

With reference to FIG. 5, the mix block 70 includes a set of internal threads 120. With reference to FIGS. 6-8C, the swivel connector 18 includes a first portion 122 having external threads 124 that engage with the internal threads 120 to releasably couple the swivel connector 18 to the mix block 70. In other embodiments the mix block 70 includes a set of external threads and the swivel connector 18 includes a set of internal threads. In some embodiments, the mix block 70 is coupled to the swivel connector 18 with structures other than threads.

Figure 6C:
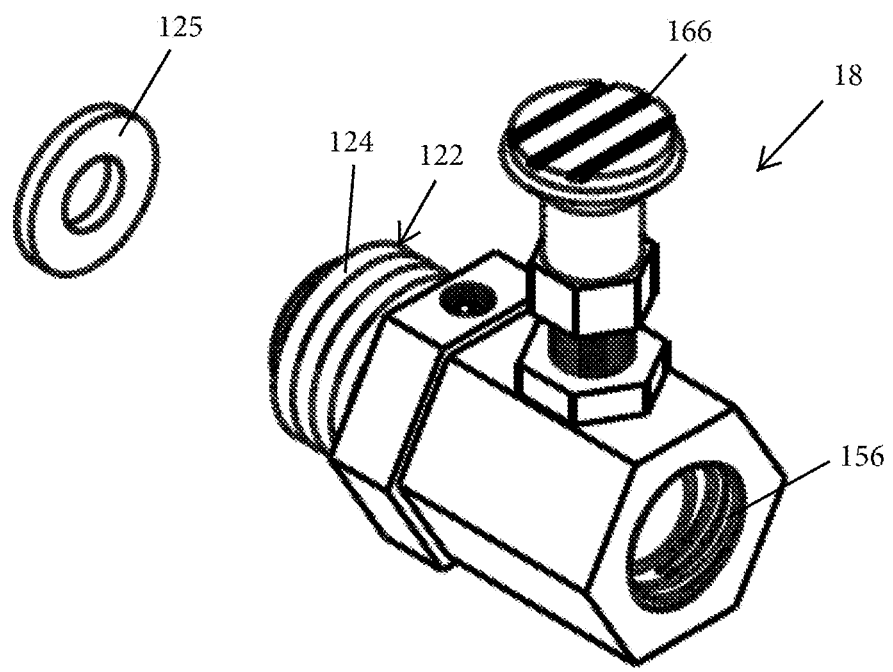
FIG. 6C is a perspective view of the swivel connector and a washer.

With reference to FIGS. 5 and 6C, in some embodiments a washer 125 (FIG. 6B) is disposed between the mix block 70 and the swivel connector 18 to seal against leakage.

Figure 7C:
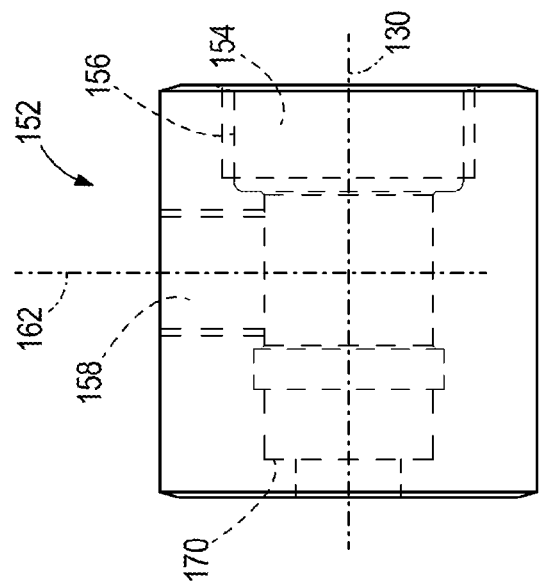
FIG. 7C is a side view of a second portion of the swivel connector.
Figure 7B:
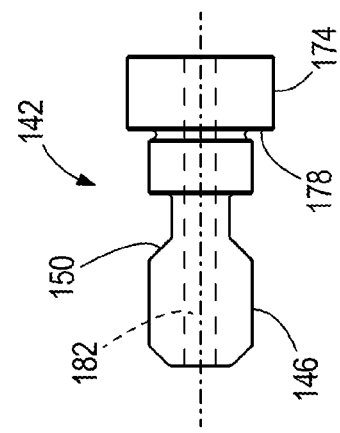
FIG. 7B is a side view of a connector pin of the swivel connector.
Figure 7A:
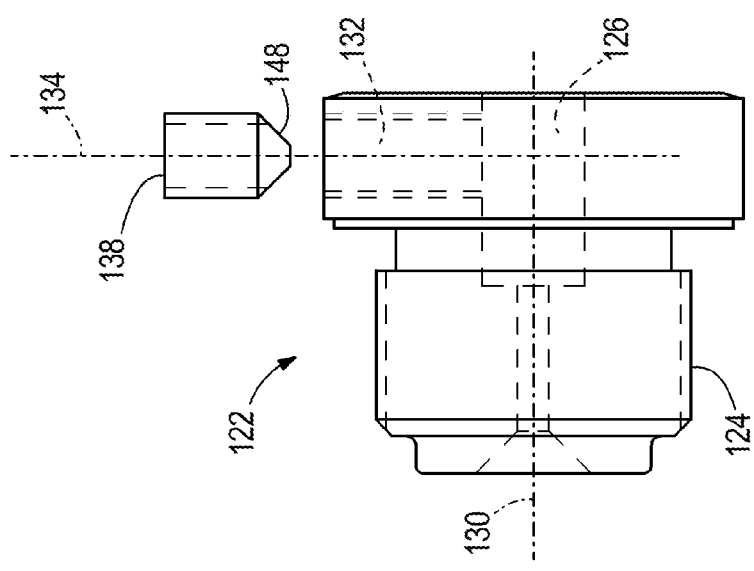
FIG. 7A is a side view of a first portion of the swivel connector, and a lock screw that is removably inserted into the first portion.

As illustrated in FIG. 7A, the first portion 122 includes a first interior passage 126 that extends entirely through the first portion 122 along a longitudinal axis 130. The first portion 122 further includes a second interior passage 132 that extends along an axis 134 that is perpendicular to the longitudinal axis 130. The swivel connector 18 further includes a first locking member 138 (e.g., set screw) that extends into the second interior passage 132 and toward the first interior passage 126 (e.g., as seen in FIG. 8B).

Figure 8C:
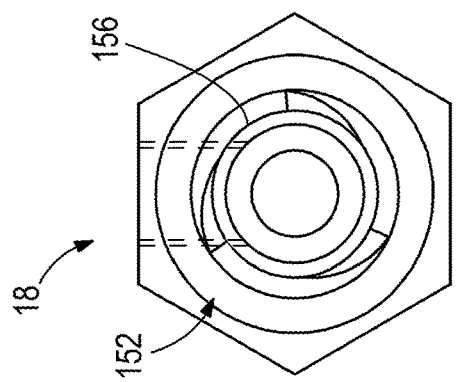
FIG. 8C is a front view of the swivel connector, fully assembled.
Figure 8B:
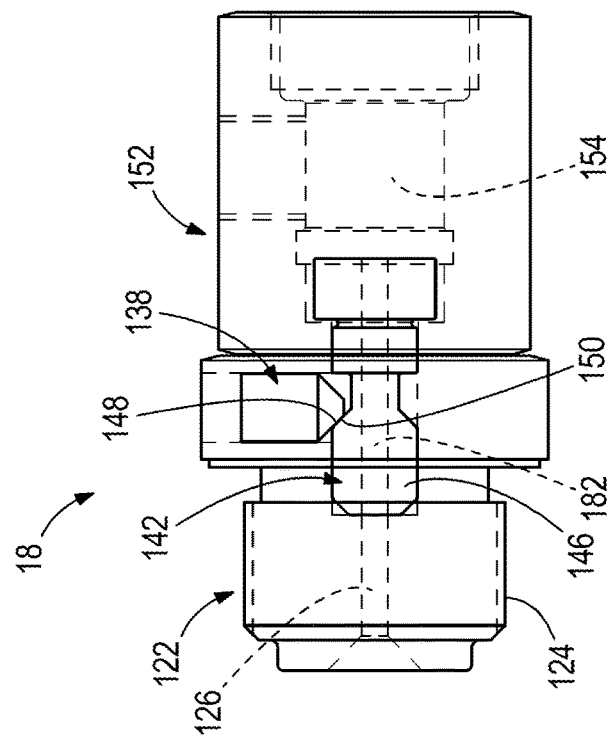
FIG. 8B is a side view of the swivel connector, fully assembled.
Figure 8A:
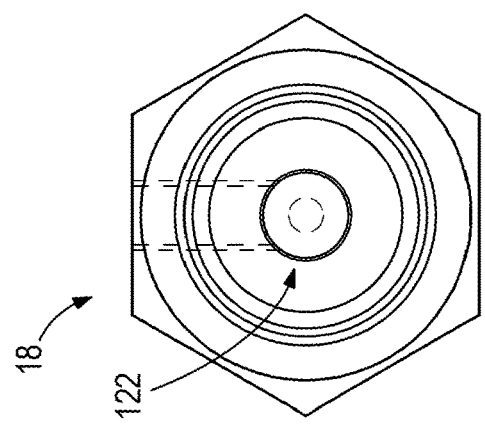
FIG. 8A is a rear view of the assembled swivel connector, fully assembled.

With reference to FIGS. 7B and 8B, the swivel connector 18 further includes a connector pin 142. The connector pin 142 includes an enlarged first end 146 that extends into the first interior passage 126. As illustrated in FIG. 8B, when the first locking member 138 is extended along the second interior passage 132 and toward the first interior passage 126, a surface 148 of the first locking member 138 (e.g., on an angled tip) extends down into the first interior passage 126 and presses against a surface 150 of the enlarged first end 146 of the connector pin 142 (e.g., on an angled portion of the enlarged first end 146), thereby inhibiting or preventing axial movement of the connector pin 142 along the longitudinal axis 130.

With reference to FIGS. 7C and 8B, the swivel connector 18 also includes a second portion 152. The second portion 152 includes a third interior passage 154 that extends entirely through the second portion 152 along the longitudinal axis 130, and a set of internal threads 156 along the third interior passage 154. The second portion 152 further includes a fourth interior passage 158 that extends along an axis 162 that is perpendicular to the longitudinal axis 130. As illustrated in FIGS. 6A and 6B, the swivel connector 18 further includes a second locking member 166 (e.g., a spring-biased plunger, or a plunger that manually threads into the swivel connector 18) that extends along the fourth interior passage 158 and toward the third interior passage 154. In the illustrated construction the second locking member 166 is spring-biased toward the third interior passage 154, and includes a distal end 168 having a normal position within the third interior passage 154, such that the second locking member 166 must be pulled away from the third interior passage 154 against the bias of the second locking member 166 to open the third interior passage 154 completely.

With reference to FIGS. 7B, 7C, and 8B, the third interior passage 154 defines an interior surface 170 (e.g., circumferential wall) within the second portion 152 of the swivel connector 18 that extends perpendicular to the longitudinal axis 130. As illustrated in FIGS. 7B and 8B, the connector pin 142 includes an enlarged second end 174 having a surface 178 that also extends perpendicular to the longitudinal axis 130.

To assemble the swivel connector 18, the connector pin 142 is first passed through the third interior passage 154 along the longitudinal axis 130 (i.e., along a direction to the left in FIGS. 7A-7C), until the surface 178 of the enlarged second end 174 presses against the interior surface 170 and the enlarged first end 146 has passed into the first interior passage 126 of the first portion 122. The first locking member 138 is then moved down the second interior passage 132 until a portion of the first locking member 138 passes into the first interior passage 126 and the surface 148 of the first locking member 138 contacts the surface 150 of the connector pin 142. In this state, illustrated in FIG. 8B, the first portion 122 and the second portion 152 of the swivel connector 18 are pressed and locked together axially along the longitudinal axis 130. As illustrated in FIGS. 7B and 8B, the connector pin 142 itself also includes a fifth interior passage 182. When the first portion 122 and the second portion 152 of the swivel connector 18 are pressed and locked together, the fifth interior passage 182 is aligned with the first interior passage 126 and the third interior passage 154 along the longitudinal axis 130, creating a single overall interior passage for movement of air and/or polyurethane foam (or other material as desired) through the entire swivel connector 18.

In other constructions, the connector pin 142 is not included, and the first portion 122 and the second portion 152 are coupled together without the connector pin 142 (e.g., by a threaded connection or via another connecting structure). In some constructions, the first portion 122 and the second portion 152 are integrally coupled together as a single piece.

Figure 11:
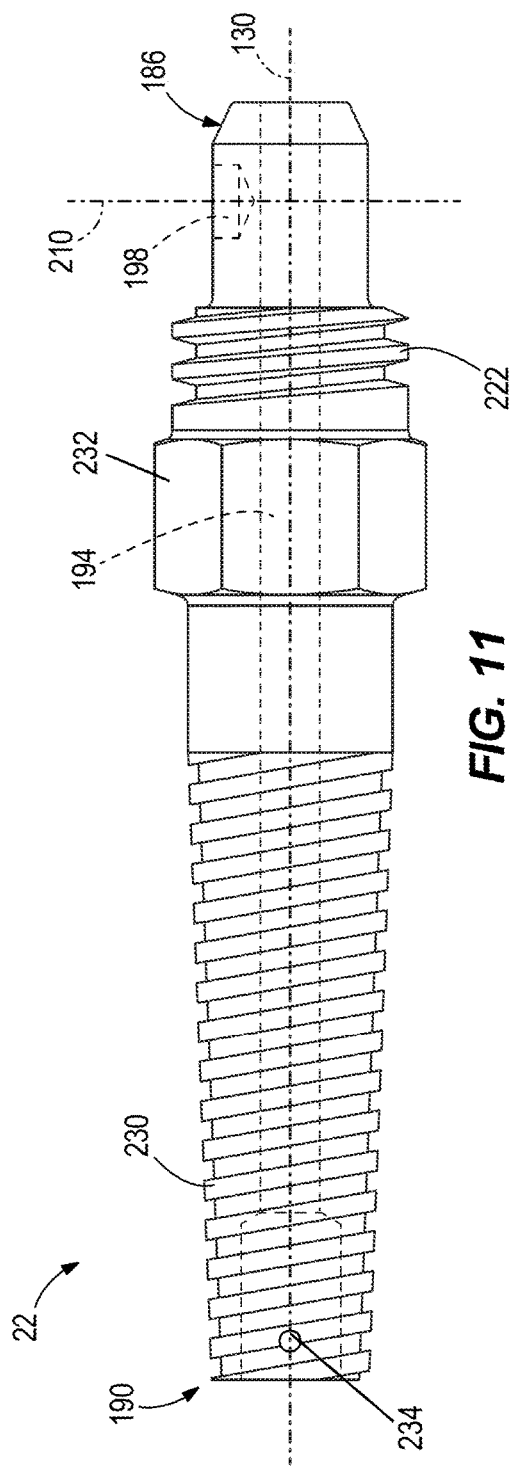
FIG. 11 is a side view of the injection port, illustrating an interior passage in the injection port.
Figure 12:
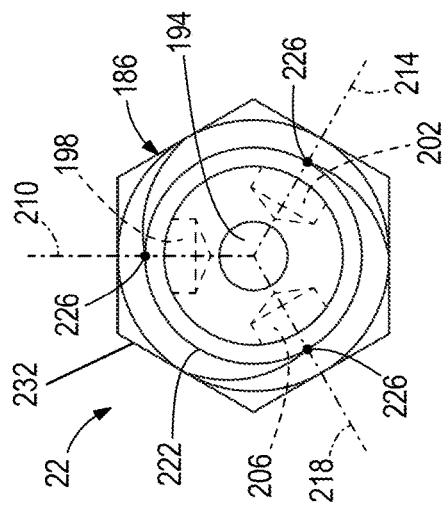
FIG. 12 is a front view of the injection port.

With reference to FIGS. 9-12, the injection port 22 includes a first end 186 and a second end 190 disposed opposite the first end 186. As illustrated in FIG. 11, the injection port 22 includes a first interior passage 194 that extends entirely from the first end 186 to the second end 190 along the longitudinal axis 130, such that the first interior passage 194 is exposed at opposite ends of the injection port 22. The injection port 22 further includes a second interior passage 198, a third interior passage 202, and a fourth interior passage 206 (all three illustrated in FIG. 12). The second interior passage 198, the third interior passage 202, and the fourth interior passage 206 each extend along axes 210, 214, 218, respectively, that are perpendicular to the longitudinal axis 130. Each of the second interior passage 198, the third interior passage 202, and the fourth interior passage 206 are disposed at the first end 186 of the injection port 22, and as illustrated in FIG. 12, the second interior passage 198, the third interior passage 202, and the fourth interior passage 206 each define blind bores that extend towards, but do not intersect, the first interior passage 194. While the illustrated embodiment includes three different blind bores at the first end 186 that are spaced equidistantly from one another around the first end 186, other constructions include different numbers or arrangements than that illustrated.

With continued reference to FIGS. 9-12, the injection port 22 further includes a first set of external threads 222 adjacent the first end 186. The first set of external threads 222 engage with the internal threads 156 (FIGS. 7C and 8C) in the second portion 152 of the swivel connector 18 to couple the injection port 22 to the swivel connector 18. With reference to FIG. 12, in the illustrated embodiment the first set of external threads 222 are right-hand threads and include three different thread starting points 226, corresponding to the three different blind bores at the first end 186.

With reference to FIG. 11, the injection port 22 further includes a second set of external threads 230 that extend from the second end 190 toward the first end 186. A tool engagement surface 232 is disposed between the first set of external threads 222 and the second set of external threads 230. The tool engagement surface 232 and the second set of external threads 230 are configured to be engaged by a tool, and facilitate coupling of the injection port 22 into the cement or other material (e.g., by twisting or otherwise threading and securing the second end 190 of the injection port 22 into the cement or material underneath cement with a wrench or other tool, or into another structure that has already been drilled or otherwise placed into the concrete or other material), and holding the injection port 22 in place once it has been coupled to the cement or other material.

With continued reference to FIG. 11, the injection port 22 further includes a fifth interior passage 234, disposed at the second end 190 of the injection port 22. The fifth interior passage 234 is an aperture that extends through the entire injection port 22 and passes through the first interior passage 194 along a direction that is perpendicular to the longitudinal axis 130.

Figure 12A:
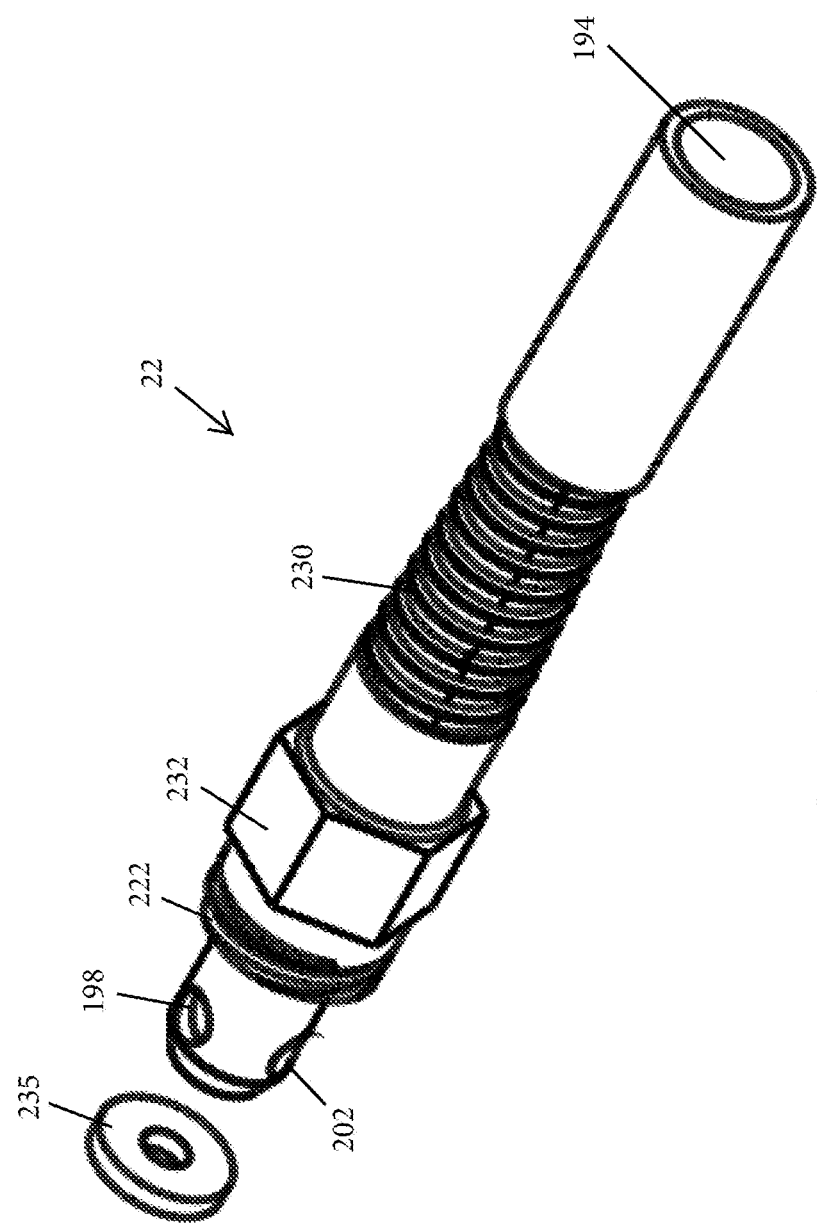
FIG. 12A is a perspective view of the injection port and a washer.

With reference to FIG. 12A, in some embodiments a washer 235 is disposed between the injection port 22 and the swivel connector 18 to seal against leakage.

Figure 12B:
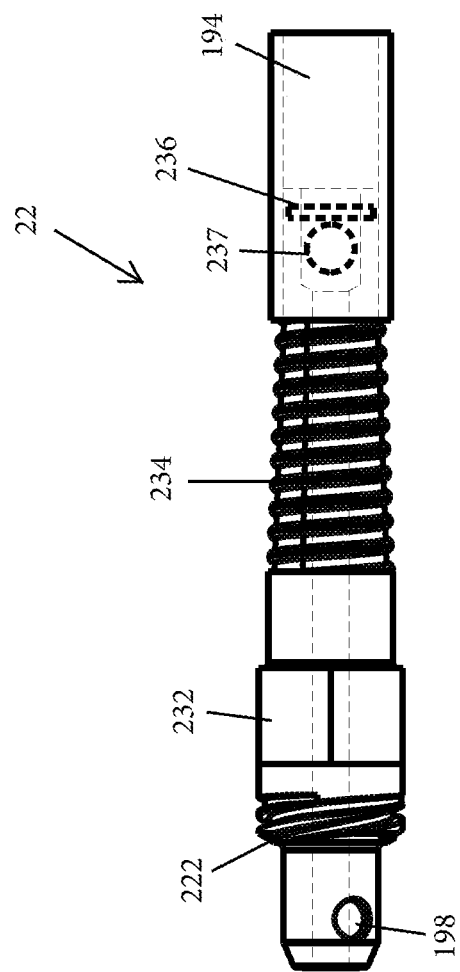
FIG. 12B is a side view of the injection port, illustrating a sleeve and check ball.

With reference to FIG. 12B, in some embodiments the injection port 22 includes a sleeve 236 and a check ball 237. The sleeve 236 makes a leak proof seal between the concrete (or other material) and the injection port 22. The check ball 237 inhibits or prevents the polyurethane foam from traveling back up the injection port 22 and spilling onto the concrete or backing up into the swivel connector 18 or fluid housing 14.

Figure 13:
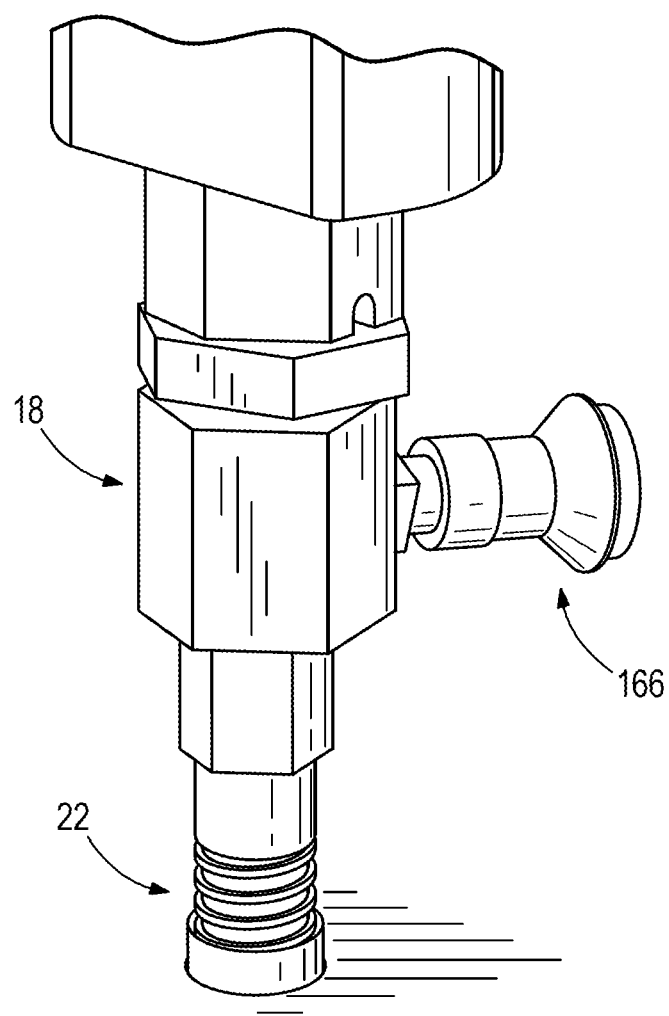
FIG. 13 is a perspective view of the swivel connector and the injection port, coupled together.

With reference to FIGS. 1 and 13, during operation an operator inserts the injection port 22 into an opening in cement (or other material) until the second end 190 of the injection port 22 and substantially all or all of the second set of external threads 230 are buried underneath a top layer 238 of the cement, leaving the first end 186 of the injection port 22 exposed above the top layer 238. The injection port 22 is thereby firmly held in the cement, with the longitudinal axis 130 extending upwardly and perpendicular to the top layer 238 of the cement, and with the first interior passage 194 of the injection port 22 exposed at the first end 186 of the injection port 22.

During operation the operator also couples the swivel connector 18 to the fluid housing 14 by inserting the first portion 122 of the swivel connector 18 into the mix block 70, and engaging the external threads 124 of the first portion 122 with the internal threads 120 of the mix block 70. Once the swivel connector 18 has been coupled to the fluid housing 14, the operator then lowers the combined fluid housing 14 and swivel connector 18 over the first end 186 of the injection port 22, until the set of internal threads 156 in the second portion 152 of the swivel connector 18 contact the first set of external threads 222 adjacent the first end 186 of the swivel connector 18. The operator then holds the fluid housing 14 still (e.g., holds onto the handle 58), while rotating the swivel connector 18 relative to the fluid housing 14 and the injection port 22. As the swivel connector 18 is rotated, the internal threads 156 engage with one of the three different thread starting points 226 on the first end 186 of the injection port 22, and begin to thread with the external threads 222 on the injection port 22.

Figure 9:
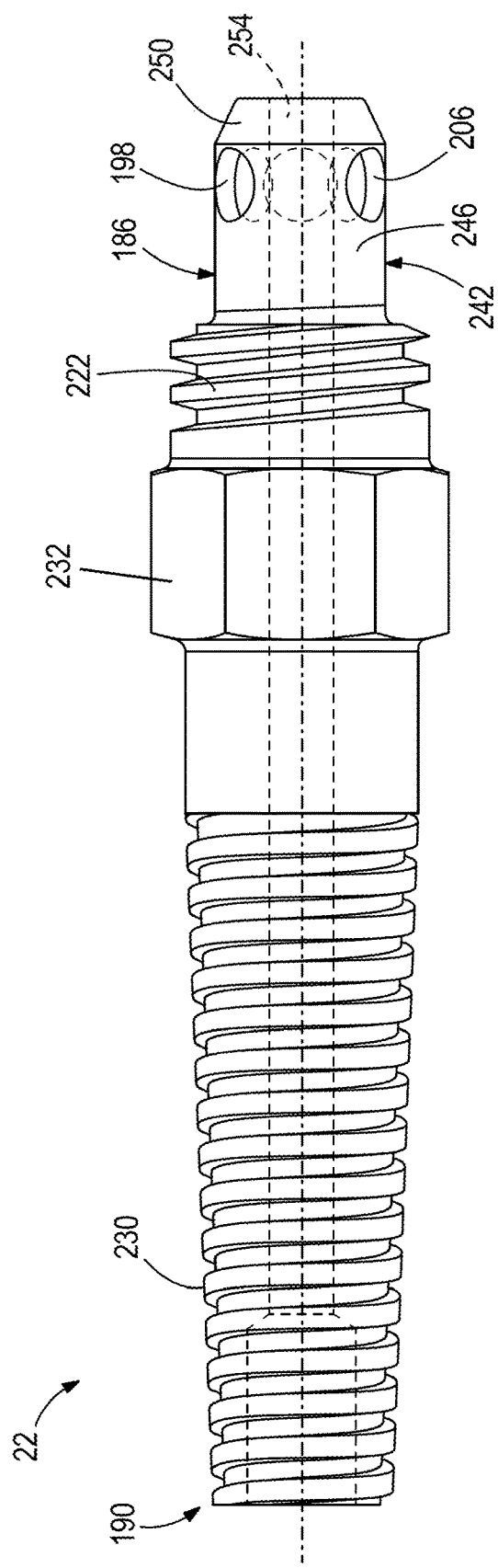
FIG. 9 is a side view of an injection port of the spray gun.
Figure 10:
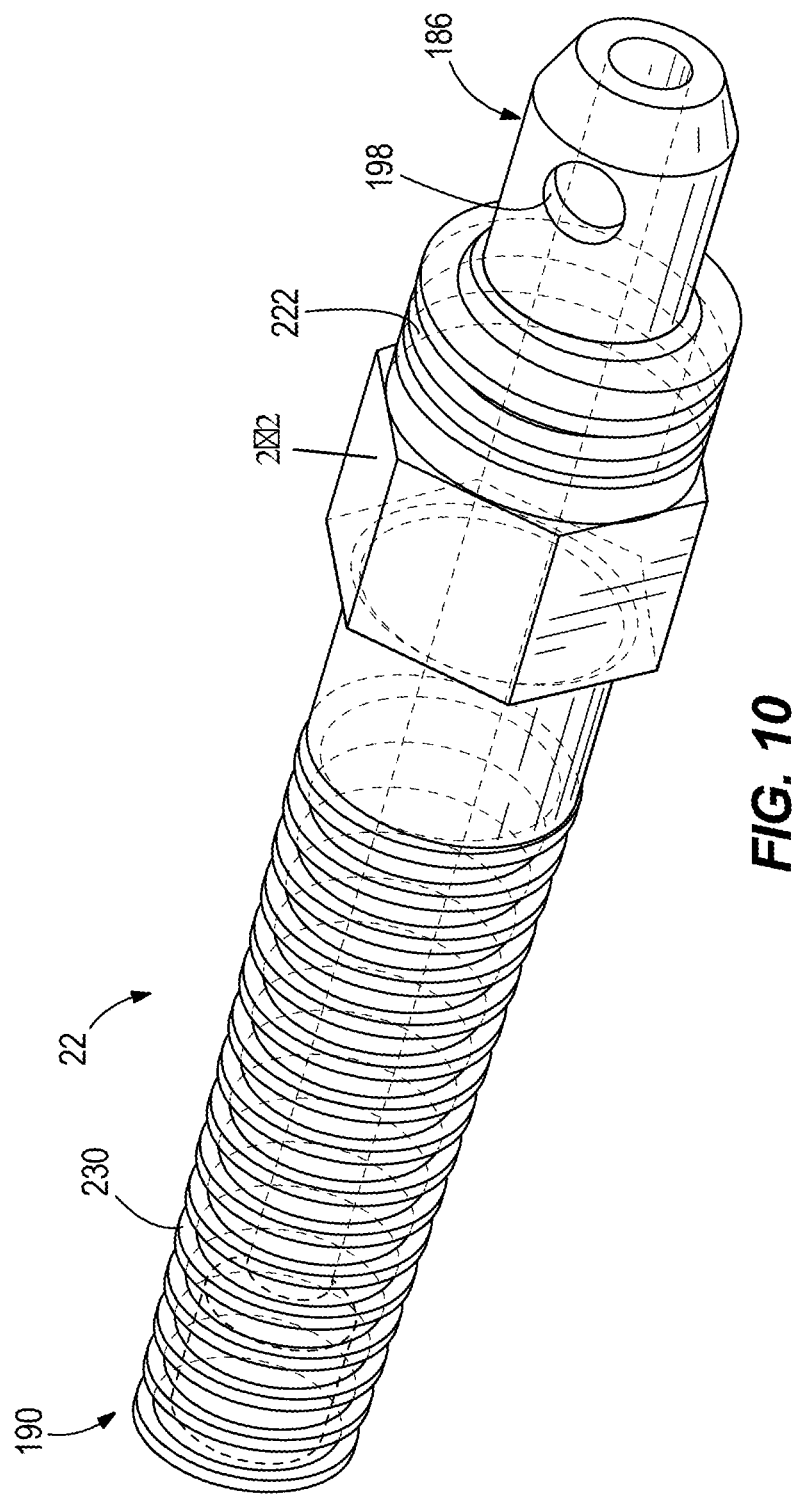
FIG. 10 is a perspective view of the injection port.

As the swivel connector 18 is rotated, the second locking member 166 (e.g., spring-biased plunger) is initially pressed away from its normally radially-inwardly biased position. For example, as illustrated in FIG. 9, the first end 186 of the injection port 22 includes a cylindrical region 242 with a first outer surface 246, and a tapered region 250 with a second outer surface 254. When the swivel connector 18 is initially lowered over the first end 186 of the injection port 22, the distal end 168 of the second locking member 166 contacts the second outer surface 254 of the tapered region 250 and slides along the second outer surface 254, forcing the second locking member 166 radially outwardly and away from its naturally biased position, until the distal end 168 of the second locking member 166 is in contact with the first outer surface 246 of the cylindrical region 242. In some embodiments, the operator himself or herself may additionally or alternatively pull radially outwardly on the second locking member 166, to help move the second locking member 166 away from its naturally biased position, allowing the swivel connector 18 to fit over and rotate relative to the first end 186 of the injection port 22.

As the swivel connector 18 continues to rotate relative to the fluid housing 14 and the injection port 22, the second locking member 166 eventually reaches the second interior passage 198, the third interior passage 202, or the fourth interior passage 206 of the swivel connector 18 (e.g., one of the three blind bores at the first end 186). The distal end 168 of the second locking member 166 then simply snaps radially inwardly into the second interior passage 198, the third interior passage 202, or the fourth interior passage 206 (via the radially-inwardly biased nature of the second locking member 166), rotationally locking the swivel connector 18 in place relative to the injection port 22. Once the swivel connector 18 has been secured to the injection port 22, the operator then moves the lever 111 from the "OFF" position to either the "AIR" position or the "FOAM" position.

With reference to FIGS. 3 and 4A, in the "OFF" position, the first valve gear 78 is initially in a rotational position where the first ball valve 103 is closed and air cannot pass from the first inlet 30 to the mix block 70, the second valve gear 82 is initially in a rotational position where the second ball valve 104 is closed and the "A" component cannot pass from the second inlet 34 to the mix block 70, and the third valve gear 86 is initially in a rotational position where the third ball valve 104 is closed the "B" component cannot pass from the third inlet 38 to the mix block 70. In some embodiments a first passage extends within the valve block 62 from the first inlet 30 to the first check valve 106 and the mix block 70, a second separate passage extends from the second inlet 34 to the second check valve 110 and the mix block 70, and a third separate passage extends from the third inlet 38 to the third check valve 114 and the mix block 70. When the lever 111 is in the "OFF" position, the three passages are blocked by the first ball valve 103, second ball valve 104, and third ball valve 105.

In the "AIR" position, the center gear 74 has been rotated in a first direction, causing the first valve gear 78 to rotate, such that air passes from first inlet 30, through the first ball valve 103 and the first check valve 106, through the mix block 70, through the first interior passage 126, the fifth interior passage 182 (i.e., through the connector pin 142), and the third interior passage 154 of the swivel connector 18 (FIG. 8B), and into the first interior passage 194 of the injection port 22. The air then travels down the injection port 22, and exits out the second end 190 of the injection port 22 along the longitudinal axis 130 and/or out the fifth interior passage 234 of the injection port 22 (FIG. 11), into a region beneath the concrete. Movement of the air under the concrete creates a space for injection of the polyurethane foam.

In the "FOAM" position, the center gear 74 has been rotated in a second, opposite direction, causing the second valve gear 82 and the third valve gear 86 to rotate, such that the "A" component and the "B" component materials pass through the mix block 70, through the second ball valve 104 and third ball valve 105, and to the first interior passage 126 of the swivel connector 18, where the "A" component and the "B" component mix together to form the polyurethane foam. The polyurethane foam then travels through the fifth interior passage 182 and the third interior passage 154 of the swivel connector 18, and into the first interior passage 194 of the injection port 22. The polyurethane foam then travels down the injection port 22, and exits out the second end 190 of the injection port 22 along the longitudinal axis 130 and/or out the fifth interior passage 234 of the injection port 22, into the space created by the air.

Once the operator is finished adding foam underneath the concrete, the operator then moves the handle 111 back to the "OFF" position. The operator may then remove swivel connector 18 from the injection port 22 (e.g., by pulling radially outwardly on the second locking member 166 and rotating the swivel connector 18) and move the fluid housing 14 and the swivel connector 18 to another injection port 22 (see FIG. 1) to add polyurethane foam to another area underneath the concrete.

It is understood that the invention may embody other specific forms without departing from the spirit or central characteristics thereof. The disclosure of aspects and embodiments, therefore, are to be considered as illustrative and not restrictive. While specific embodiments have been illustrated and described, other modifications may be made without significantly departing from the spirit of the invention.

Various features and advantages of the invention are set forth in the following claims.

What is claimed is:

1. An injection port comprising:
   a first end;
   a second end disposed opposite the first end along a longitudinal axis;
   an interior passage extending between the first end and the second end along the longitudinal axis; and
   a set of external threads disposed adjacent the first end, wherein the external threads include a plurality of different starting points;
   wherein the first end includes three blind bores that extend toward the interior passage along axes perpendicular to the longitudinal axis;
   wherein the set of external threads includes three different starting points, each corresponding to one of the three blind bores.

2. The injection port of claim 1, further comprising an aperture at the second end that extends perpendicular to the longitudinal axis and intersects the interior passage.

3. The injection port of claim 1, further comprising a plurality of tool engagement surfaces between the first end and the second end configured to be engaged by a wrench to twist the injection port and secure the injection port into concrete.

4. The injection port of claim 1, wherein the set of external threads is a first set of external threads, and further comprising a second set of external threads at the second end.

5. A spray gun comprising:
   a swivel connector having a set of internal threads; and
   the injection port of claim 1, wherein the set of external threads is configured to engage with the internal threads of the swivel connector.

6. The spray gun of claim 5, wherein the interior passage is a first interior passage, and wherein the swivel connector includes a second interior passage that is aligned with the first interior passage along the longitudinal axis.

7. The spray gun of claim 5, further comprising a fluid housing coupled to the swivel connector, wherein the fluid housing includes a first inlet for connection to a source of pressurized air, a second inlet for connection to a source of a first polyurethane foam component, and a third inlet for connection to a source of a second polyurethane foam component.

8. A spray gun comprising:
   a fluid housing having:
      a main body with a first inlet for connection to a source of pressurized air, a second inlet for connection to a source of a first polyurethane foam component, and a third inlet for connection to a source of a second polyurethane foam component;
      a mix block coupled to the main body, wherein the mix block includes a set of internal threads; and
      a lever coupled to the main body, wherein the lever is adjustable to an OFF position where no air or polyurethane components are permitted to move through the main body, an AIR position where only air is permitted to move through the main body, and a FOAM position where only the first and second polyurethane foam components are permitted to move through the main body;
   a swivel connector releasably coupled to the fluid housing, the swivel connector having:
      a first portion,
      a second portion coupled to the first portion, the second portion including a first interior passage that extends along a longitudinal axis and a second interior passage that extends along an axis perpendicular to the longitudinal axis, wherein the first interior passage defines an interior space; and,
      a spring-biased locking member coupled to the second portion, wherein a portion of the spring-biased locking member extends into the second interior passage and is biased perpendicular to the longitudinal axis and radially-inwardly toward to first interior passage; and
   an injection port releasably coupled to the swivel connector, the injection port having:

a first end;

a second end disposed opposite the first end along a longitudinal axis;

an interior passage extending between the first end and the second end along the longitudinal axis; and a plurality of blind bores disposed at the first end, wherein each blind bore extends perpendicular to the longitudinal axis.

9. The spray gun of claim 8, wherein the main body further includes a valve block having a center gear, a first valve gear coupled to and driven by the center gear, a second valve gear coupled to and driven by the center gear, and a third valve gear coupled to and driven by the center gear.

10. The spray gun of claim 8, wherein the swivel connector further includes a connector pin coupled to both the first portion and the second portion.

11. The spray gun of claim 8, wherein the injection port includes a set of external threads disposed adjacent the first end, where the external threads include a plurality of different starting points.

12. A spray gun comprising:

a swivel connector having a set of internal threads; and an injection port having a first end, a second end disposed opposite the first end along a longitudinal axis, an interior passage extending between the first end and the second end along the longitudinal axis, and a set of external threads disposed adjacent the first end, wherein the external threads include a plurality of different starting points, wherein the set of external threads is configured to engage with the internal threads of the swivel connector; and a fluid housing coupled to the swivel connector, wherein the fluid housing includes a first inlet for connection to a source of pressurized air, a second inlet for connection to a source of a first polyurethane foam component, and a third inlet for connection to a source of a second polyurethane foam component.

13. The spray gun of claim 12, wherein the first end includes three blind bores that extend toward the interior passage along axes perpendicular to the longitudinal axis.

* * * * *